Jan. 17, 1933.  L. C. KARSTEDT  1,894,516
BRUSH CUTTER
Filed Nov. 13, 1931

INVENTOR
Lorance C. Karstedt
John A. Naismith
ATTORNEY

Patented Jan. 17, 1933

1,894,516

UNITED STATES PATENT OFFICE

LORANCE C. KARSTEDT, OF WATSONVILLE, CALIFORNIA

BRUSH CUTTER

Application filed November 13, 1931. Serial No. 574,847.

This invention relates particularly to a brush cutter mountable upon, and used in connection with, a tractor, particularly of the tracklaying type.

In those sections of the country where the land is covered with sagebrush, mesquite, willows and other small and worthless trees, areas have heretofore been cleared either by hand labor, or by mechanical means which left the cut material in a form in which it could not be readily destroyed.

Where mechanical means have been used they have proved unsatisfactory because they are mounted upon a tractor in such a manner as to throw the cut material all to one side of the machine, piling it up in rows where it dries very slowly and is difficult to burn. In fact, material cut in this manner requires considerable handling and turning before it can be completely destroyed.

It is the object of my invention to provide a means that will so cut and place the material, designated generally as brush, that it may be easily destroyed without further manipulation.

It is another object of the invention to provide a means of the character indicated that may be quickly and easily mounted upon a tractor, that may be readily adjusted to cut the brush below the surface of the ground, that may be adjusted as desired above the surface of the ground, that will be simple in form and construction, economical to manufacture, strong, durable, and highly efficient in its practical application.

Figure 1:
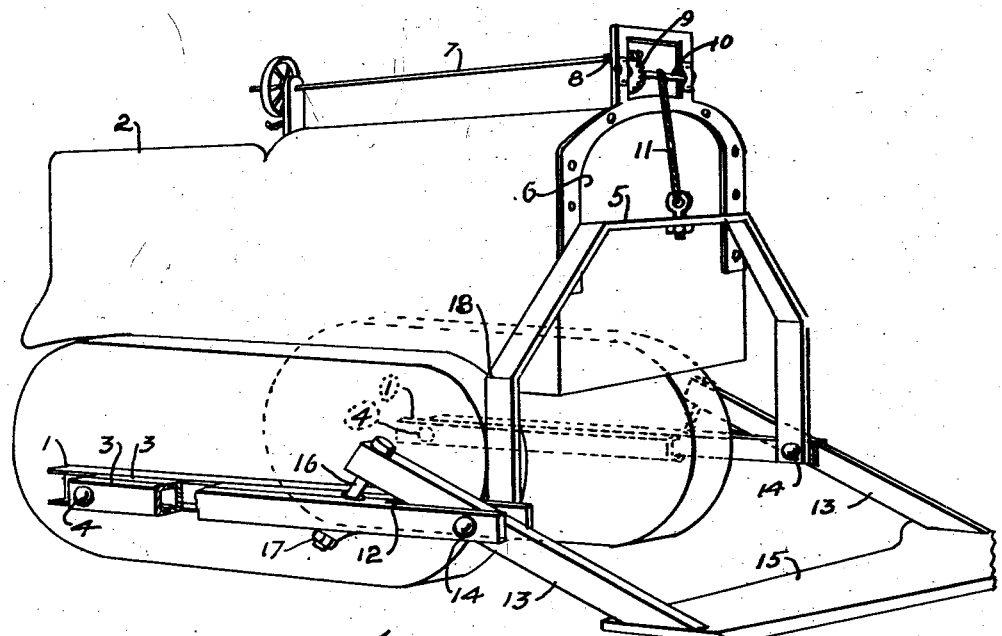
Figure 1 is a perspective illustration of a device embodying my invention operatively mounted upon a tracklaying tractor, part broken away.
Figure 2:
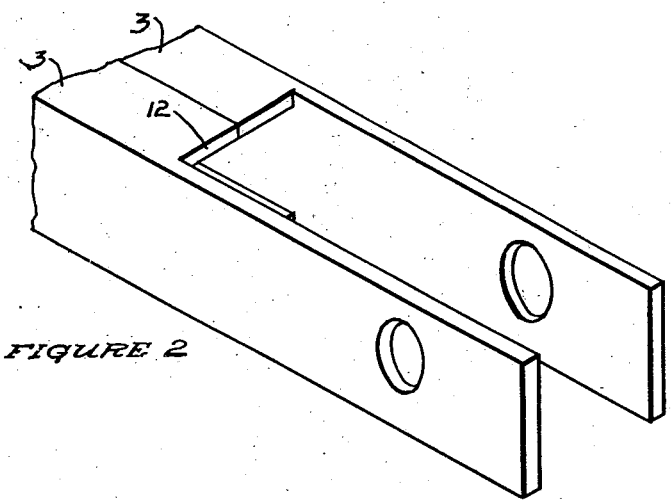
Figure 2 is an isometric perspective view of a portion of the supporting frame of the device.

In the embodiment of the device as herein disclosed I show at 1—1 the two side bars forming a part of the main framework of a tracklaying tractor shown in outline at 2.

On each side of the tractor is disposed a beam formed of a pair of channel irons 3—3 and pivotally mounted on a bar 1 near its rear end as indicated at 4, whereby to be swingable in a vertical plane. A yoke 5 is mounted upon the two beams in such a manner as to extend across the front of the tractor just forwardly of the radiator 6, and means for raising and lowering the beams is connected to the yoke and manipulated in any suitable manner as shown at 7 where a worm 8 meshes with a gear 9 on a shaft 10 over which winds a cable 11 attached to the yoke 5.

The webs at the forward end of each channel iron of each beam are cut away as shown at 12 and a heavy bar 13 is disposed between the remaining side portions and pivotally mounted therein as at 14, the two bars 13—13 having a brush cutter blade 15 mounted on their forward ends to normally lie in a horizontal plane as shown and angularly disposed relative to the path of travel of the tractor.

The blade 15 may be adjusted about the pivotal mountings 14—14 in any suitable manner, in the present case a bolt is shown passing through each bar as at 16 and through the supporting beam on which it is mounted and fitted with an adjusting nut 17, the parts being formed to permit movement of the bar relative to the beam when being adjusted.

By means of this construction the cutter mechanism may be readily adjusted to place the cutter blade slightly below the surface of the ground where it will more readily cut through heavier material such as the trunks of young trees, the adjustment at 16 permitting the operator to set the blade 15 to cut in a horizontal plane in any desired position.

When in operation the form and arrangement of the parts is such that the cut material readily slides over the blade 15 and is rolled out flat upon the ground in a relatively thin layer. This disposition enables the material to dry quickly so that it may be burned without further handling.

Since the yoke 5 extends across the face of the tractor and immediately in front of the radiator it serves not only as a means for adjusting the blade but also as a protection for the said radiator and as a means for thrusting the heavier brush and young trees downwardly and forwardly so that the tractor can readily pass over them. The form of the yoke is of importance for this reason, the sides being directed inwardly and upwardly from points near or below the upper level of the tractor tracks as shown at 18.

It is to be understood, of course, that while I have herein shown and described but one specific embodiment of the invention, changes in form, construction, and method of construction and operation may be made within the scope of the appended claims.

I claim:

1. The combination of a tractor and a brush cutter mounted thereon forwardly thereof and disposed in a substantially horizontal plane, and means extending across the face of the tractor and thence downwardly to points adjacent the tractor tracks and rearwardly of the cutter and adapted to throw the cut material beneath the tractor.

2. The combination with a tractor of a beam pivotally mounted on each side thereof and rearwardly thereof, and extending forwardly thereof, means for adjusting the beams in vertical planes, a cutter blade disposed transversely of the beams and forwardly thereof, arms pivotally mounted on said beams and attached to said blade, and means for adjusting said arms about their pivotal mountings.

LORANCE C. KARSTEDT.